United States Patent [19]

Murase

[11] Patent Number: 4,461,584
[45] Date of Patent: Jul. 24, 1984

[54] ELECTRONIC CLINICAL THERMOMETER
[75] Inventor: Masakazu Murase, Fuji, Japan
[73] Assignee: Terumo Kabushiki Kaisha, Tokyo, Japan
[21] Appl. No.: 418,287
[22] Filed: Sep. 15, 1982
[30] Foreign Application Priority Data
Dec. 28, 1981 [JP] Japan ................... 56-214320
[51] Int. Cl.³ .............................. G01V 1/28
[52] U.S. Cl. ................... 374/188; 374/183; 374/184; 374/185
[58] Field of Search ............ 374/188, 183, 184, 185, 374/205, 206, 207, 208; 340/586, 593, 595, 596, 597, 598, 599; 335/205, 207

[56] References Cited
U.S. PATENT DOCUMENTS 3,872,728  3/1975  Joyce et al. .................. 374/183
4,031,365  6/1977  Ragiotti et al. .............. 374/183
4,297,851 11/1981  Paddock et al. ............... 374/183
4,371,271  2/1983  Bellet ......................... 374/183

FOREIGN PATENT DOCUMENTS 39460 11/1981 United Kingdom .

Primary Examiner—Charles Frankfort
Assistant Examiner—David R. Schuster
Attorney, Agent, or Firm—Frishauf, Holtz, Goodman & Woodward

[57] ABSTRACT

A temperature sensing unit produces an output signal commensurate with temperature, the output signal serving as a basis for discriminating a temperature above a predetermined threshold temperature as well as a rising temperature gradient over a predetermined period of time. When a discriminator senses both conditions, a temperature measuring unit begins measuring temperature on the basis of an input from the temperature sensing unit. When the measurement begins, the measuring unit raises the resolution of temperature information from the sensing unit.

4 Claims, 11 Drawing Figures

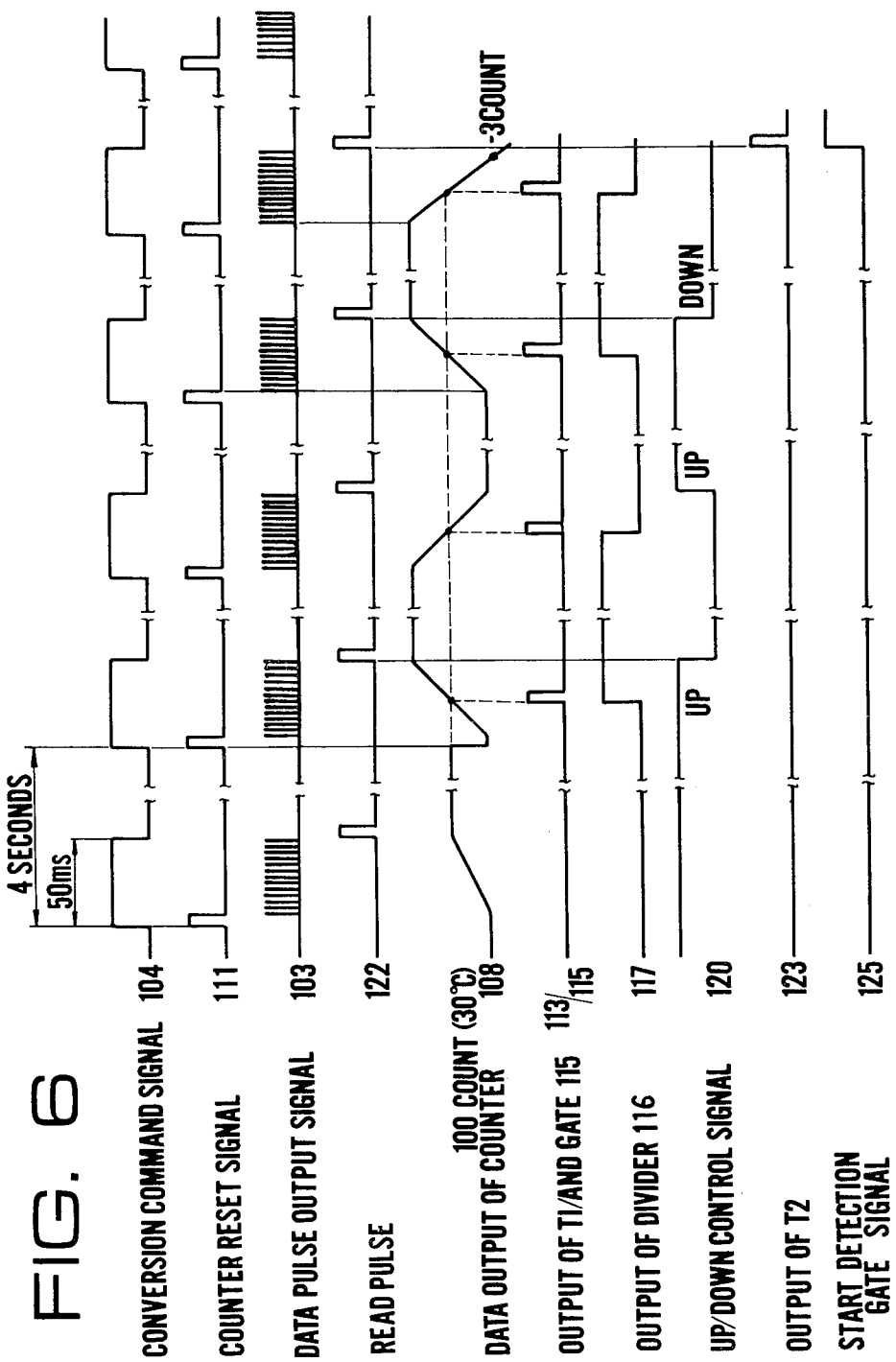

ELECTRONIC CLINICAL THERMOMETER

BACKGROUND OF THE INVENTION

This invention relates to an electronic clinical thermometer and, more particularly, to an electronic clinical thermometer which, when brought into contact with the surface of a living body, senses that the instrument is in a state enabling the body temperature to be measured.

With the rapid progress that has been made in semiconductor technology, electronic clinical thermometers have become available in which a microcomputer, namely a computer mounted on a single chip, is accommodated in an enclosure of approximately the same size as the conventional glass clinical thermometer. The electronic clinical thermometer of this type measures and displays body temperature using a battery such as a mercury lithium cell as the power supply. Owing to the large power consumption of the microcomputer, however, compact electronic clinical thermometers that rely upon batteries of a small capacity are attended by such problems as the comparatively short interval between battery changes and the likelihood of reading errors caused by run-down batteries. Some conventional electronic clinical thermometers are provided with a manually operable power switch, while others are so designed that the power supply turns on only when a measurement is actually performd. Electronic clinical thermometers of this latter type employ a touch switch or pressure switch in order to eliminate the manual switch operation, or use the touch or pressure switch in combination with a manual switch in order to reduce power consumption by interrupting the flow of current expended in measurement whenever the thermometer is not actually in contact with the body.

In the touch switch arrangement, it is common practice to use a sensing element, namely a variable impedance element, such as a capacitor or coil, of the type which experiences a change in impedance when brought close to or in contact with the human body. Since the thermometer is used with a sheath covering the probe associated with the sensing element, however, the effect of such an arrangement is a marked decline in reliability.

In another aspect, an electronic clinical thermometer equipped with a high-impedance contact sensor is adapted to sense the start of measurement by bringing the sensor into contact with the human body. However, owing to such factors as a variance in the thickness of the sheath, a variance in the gap between the sheath and the contact sensor as well as between the sheath and body surface, both reactance-variable and impedance-variable sensors fail to develop a sufficient change in impedance. Moreover, the sheath itself is electrically insulated. A sensor configuration of the above type therefore does not always guarantee that contact with the human body will be sensed with a high degree of reliability. Furthermore, touch or contact switches do not necessarily reduce power consumption to a satisfactory extent, so that the problem of rapid battery consumption remains.

SUMMARY OF THE INVENTION

Accordingly, the present invention has been devised to eliminate the above-described drawbacks encountered in the conventional electronic clinical thermometers, particularly in the sensing means for sensing the start of body temperature measurement.

The first object of the present invention is to provide an electronic clinical thermometer capable of sensing the start of temperature measurement reliably without responding falsely to a change in ambient temperature or the like, using as criteria a temperature threshold as well as a temperature gradient over a predetermined time period.

A second object of the present invention is to realize an electronic clinical thermometer of reduced size and cost by combining the heat-sensitive unit of the device for sensing the start of measurement, with the heat-sensitive unit of the electronic clinical thermometer, thereby enhancing overall reliability and reducing the number of component parts.

A third object of the present invention is to provide an electronic clinical thermometer which consumes little power, particularly when the thermometer is in a stand-by condition up to the start of measurement.

According to the present invention, the foregoing and other objects are attained by providing an electronic clinical thermometer which comprises temperature sensing means for producing an output signal commensurate with temperature, decision means for discriminating, on the basis of the output signal of the temperature sensing means, a temperature above a predetermined threshold temperature as well as a rising temperature gradient over a predetermined period of time, and measuring means placed in a measurement start mode by a discrimination signal from the decision means for initiating a temperature measurement on the basis of an input from the temperature sensing means. The decision means first discriminates a temperature above the threshold temperature and then discriminates a rising temperature gradient from the discriminated temperature, and comprises an up/down counter for producing an output signal commensurate with a temperature sensed by the temperature sensing means, and a decoder for producing a first output signal in response to an input signal from the up/down counter indicative of a count corresponding to a temperature above the threshold temperature, the first output signal changing over the counting direction of the up/down counter so that the counter is counted down by a value commensurate with temperature within the predetermined period of time, and for producing a second output signal in response to an input signal from the up/down counter indicative of a count corresponding to a rising temperature gradient of a magnitude larger than that of a predetermined rising temperature gradient, the second output signal establishing the measurement start mode. The decision means also includes reset means for resetting the value of the count in the up-down counter when the first output signal is not produced, and when the second output signal is not produced after the production of the first output signal.

In another aspect of the present invention, an electronic clinical thermometer comprises temperature sensing means for producing an output signal, commensurate with temperature, in the form of a digital value conforming to one of at least two resolutions, one of which is high and the other low, decision means for discriminating, on the basis of the output signal of the temperature sensing means conforming to the low resolution, a temperature above a predetermined threshold temperature as well as a rising temperature gradient over a predetermined period of time, resolution setting means for changing over the resolution of the temperature sensing means from low to high resolution in response to a discrimination signal from the decision means, and measuring placed in a measurement start mode by a discrimination signal from the decision means for initiating a temperature measurement on the basis of the digital value, conforming to the high resolution, from the temperature sensing means. The temperature sensing means comprises temperature-to-frequency converting means, a counter for counting the frequency and for producing a signal indicative thereof, and resolution setting means responsive to an output from the decision means for changing over the duration of a sampling operation performed by the counter from a short to a long duration. The decision means comprises an up/down counter for producing an output signal commensurate with a temperature sensed by the temperature sensing means, and a decoder for producing a first output signal in response to an input signal from the up/down counter indicative of a count corresponding to a temperature above the threshold temperature, the first output signal changing over the counting direction of the up/down counter so that the counter is counted down within the predetermined period of time by a value commensurate with temperature, and for producing a second output signal in response to an input signal from the up/down counter indicative of a count corresponding to a rising temperature gradient of a magnitude larger than that of a predetermined rising temperature gradient, the second output signal establishing the measurement start mode and controlling the resolution setting means. The decision means further includes reset means for resetting the values of the count in the up-down counter when the first output signal is not produced, and when the second output signal is not produced after the production of the first output signal.

Other features and advantages of the invention will be apparent from the following description taken in conjunction with the accompanying drawings in which like reference characters designate the same or similar parts throughout the figures thereof.

BRIEF DESCRIPTION OF THE DRAWINGS

FIGS. 2a and 2b show, in simplified form, the power supply of the electronic clinical thermometer and a control section for turning the power supply on;

FIG. 6 is a timing chart useful in describing the operation of the arrangement shown in FIG. 4;

FIGS. 9a and 9b are flow charts useful in describing CPU operation and control when the power supply of the microcomputer is turned on.

DESCRIPTION OF THE PREFERRED EMBODIMENTS

Figure 1:
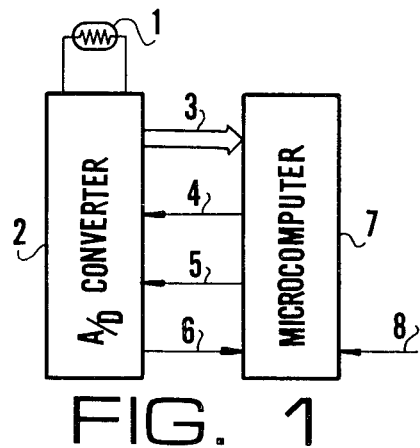
FIG. 1 is a block diagram illustrating an embodiment of an electronic clinical thermometer according to the present invention.

As shown in FIG. 1, an electronic clinical thermometer in this embodiment of the invention includes a thermister 1 the impedance whereof changes with temperature, an A/D converter 2 for converting the change in impedance into a digital quantity, a data bus 3, and a microcomputer 7 connected to the A/D converter 2 by means of the data bus 3. The microcomputer 7 sends the A/D converter 2 a signal, via line 4, for setting the resolution (accuracy) of the converter, as well as a signal, via line 5, instructing an A/D conversion. The A/D converter 2 sends the microcomputer 7 a signal, via line 6, indicating the end of an A/D conversion. In addition, the microcomputer 7 receives an interrupt signal on line 8, the signal arriving every four seconds, by way of example.

Figure 2A:
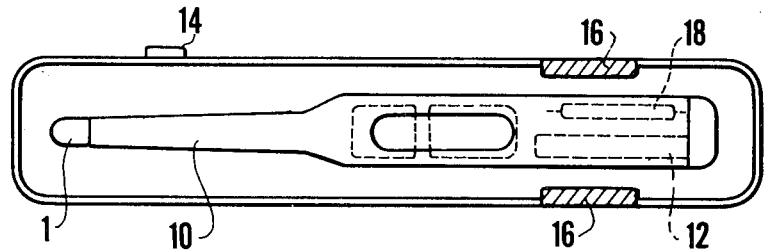
Figure 2B:
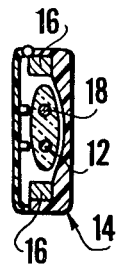

The electronic clinical thermometer 10 proper, shown in FIGS. 2a and 2b, is operated by a battery such as a mercury lithium cell constituting a power supply 12. The power supply 12 is connected to a load only when the electronic clinical thermometer performs a temperature measurement. When the thermometer is stored in its case 14, the power supply 12 is completely cut off from the load, such as a device for sensing the start of a measurement, the microcomputer, etc. To this end, a permanent magnet 16 is affixed to the case 14, while the interior of the electronic clinical thermometer is provided with a reed switch, having a normally-open contact 18, at a location where it will be acted upon by the field from the magnet 16 whenever the thermometer 10 is placed in the case 14. The circuit connections are such that the contact 18 controls the connection between the power supply 12 and the entire load. Thus, when the electronic clinical thermometer 10 is located in its case 14, absolutely no power is consumed; when taken out, the load is supplied with power as the conditions demand.

Figure 3:
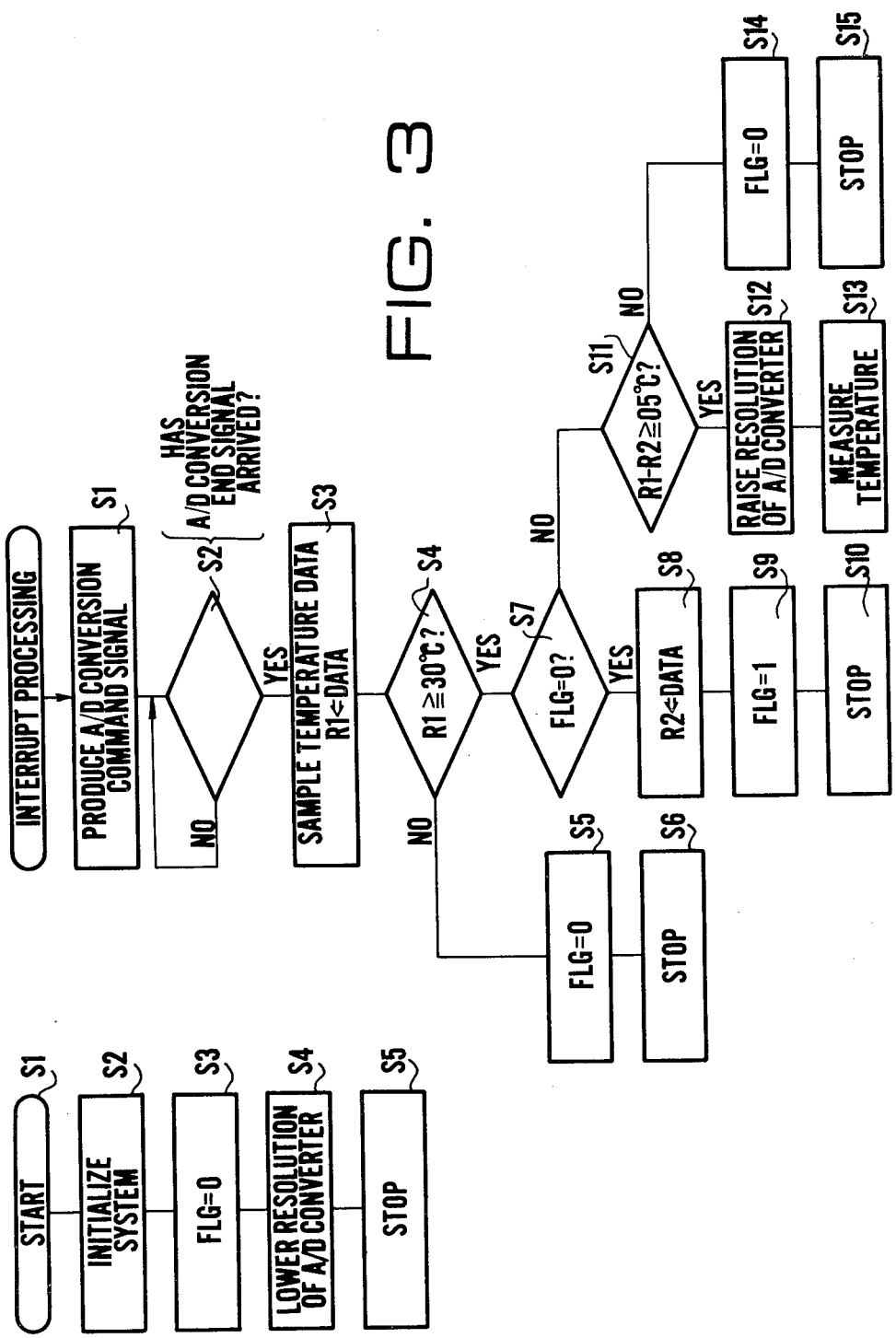
FIG. 3 is a flow chart useful in describing control effected by a CPU located in a microcomputer shown in FIG. 1.

Reference will now be had to FIG. 3, to describe control executed by the microcomputer 7. In the following discussion we shall assume a temperature gradient of not less than 0.3° C./4 sec. for a four-second sampling period, and a temperature threshold of 30° C.

When the electronic thermometer 10 is taken out of the case 14, the power supply 12 is connected to the load automatically, thereby starting the control sequence and initializing the system (steps S1 and S2). Since a flag (a logical "1" bit) will be established upon the first recognition of a temperature measurement of 30° C. or more, logical "0" is set beforehand in one part (hereinafter referred to as FLG) of a register within a RAM located in the CPU of the microcomputer (step S3).

With a preliminary measurement of temperature performed to detect arrival at the conditions for the start of measurement, a long period of time is required for the analog-to-digital conversion. In other words, for a preliminary measurement it is unnecessary to measure the temperature accurately through high resolution which requires high consumption of power. It is also unnecessary to perform the measurement continuously. Accordingly, as shown in step S4 of the flow chart, the microcomputer 7 sends a logical "0" signal to the A/D converter 2 on line 4 to set its resolution in such fashion that a preliminary measurement of low accuracy and short sampling duration is performed intermittently every four seconds, by way of example. Next, in step S5, the microcomputer halts the CPU and enters a stopped-state until the next interrupt.

The CPU starts the control routine for temperature measurement in response to an interrupt input which arrives every four seconds, by way of example, via line 8. Upon the arrival of the interrupt signal, the microcomputer 7 first applies the A/D conversion command signal to the A/D converter 2 via line 5 (step S1). In step S2, the microcomputer determines whether the A/D conversion end signal has been issued by the A/D converter 2; processing shifts to step S3 if it has. If not, step S2 is repeated until the decision in step S2 is affirmative. In step S3, the body temperature measured and converted into digital temperature data by the A/D converter 2 is read out of the converter 2 by the CPU via data bus 3 and is registered in a register R1 located in the RAM mentioned above. Step S4 requires a decision as to whether the temperature data read in by step S3 is indicative of a temperature higher than 30° C. When this is not the case, control shifts to step S5 where FLG is set to logical "0". In other words, this is a preparatory step for making the next item of temperature data stored in register R1 the first item of data indicative of a temperature of 30° C. or more. In step S6, the CPU halts to await the next interrupt.

Returning to step S4, let us now assume that the temperature data is found to indicate a temperature of 30° C. or more, in which case control moves to step S7 where it is discriminated whether FLG is logical "0". If it is, the system moves to step S8 which calls for the temperature data read in from the converter to be registered in a register R2. The process now moves to step S9 where FLG is set to logical "1", and then to step S10 where the sequence halts to await the next interrupt. With the arrival of the next interrupt, processing follows the steps S1 through S4 for the reading in of the temperature data. When step S7 is reached, the decision here will be negative since FLG will have been set to logical "1" owing to the process step S9 initiated by the previous interrupt. The process moves to step S11.

Decision step S11 requires that the last registered temperature data be compared with the current temperature data registered by the latest interrupt, namely that the arithmetic operation R1−R2 (content of register R1 minus content of register R2) be performed to determine the temperature gradient. It will be understood that this determination of the temperature gradient takes place every four seconds since this is the interval between the interrupt signals. If the condition R1−R2≦0.3° C. is found to hold in step S11, this signifies that the clinical thermometer is in a condition for performing a meaningfull temperature measurement. The microcomputer 7 therefore delivers a logical "1" signal to the A/D converter 2 on line 4 to raise the converter resolution (step S12). In other words, the converter 2 is set to sample the temperature over a longer period of time. The system then shifts to step S13 which calls for the CPU to perform an actual measurement of body temperature. When this step is reached, therefore, the four-second interrupt is inhibited.

If the decision rendered in step S11 is negative, indicating that the temperature gradient over the predetermined time interval is less than 0.3° C., the process moves to step S14, which calls for the CPU to set FLG to logical "0". The system moves then to block S15 where the sequence is halted until the next interrupt.

Figure 4:
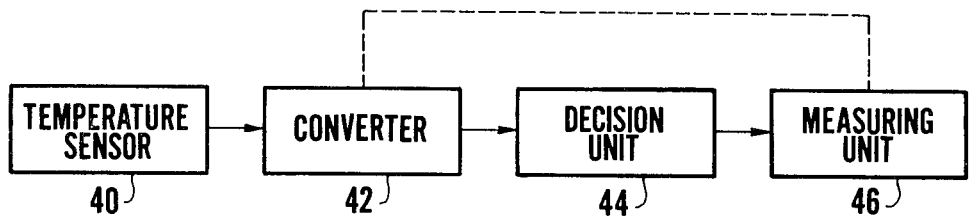
FIG. 4 is a block diagram illustrating the basic construction of a second embodiment of the present invention.

The present invention can also be realized by hardwired logic, as illustrated in the embodiment of FIG. 4. In this case the electronic clinical thermometer comprises a temperature sensing unit 40 consisting of an element such as a thermister which develops a change in resistance with temperature, a converting unit 42 for converting the oscillation frequency of an oscillator into a digital quantity proportional to the resistance of the sensing unit 40, a decision unit 44 for deciding, based on the output data from the converting unit 42, whether the thermometer is in a condition for starting a measurement, and a measuring unit 46 which starts to perform a temperature measurement only when the decision unit 44 has provided it with a signal indicating that the starting condition has been attained. When the decision unit 44 provides said signal, the measuring unit 46 delivers a control signal to the converting unit 42, as indicated by the broken line, thereby establishing a sampling duration of extended length to raise the resolution of the converter.

Figure 5:
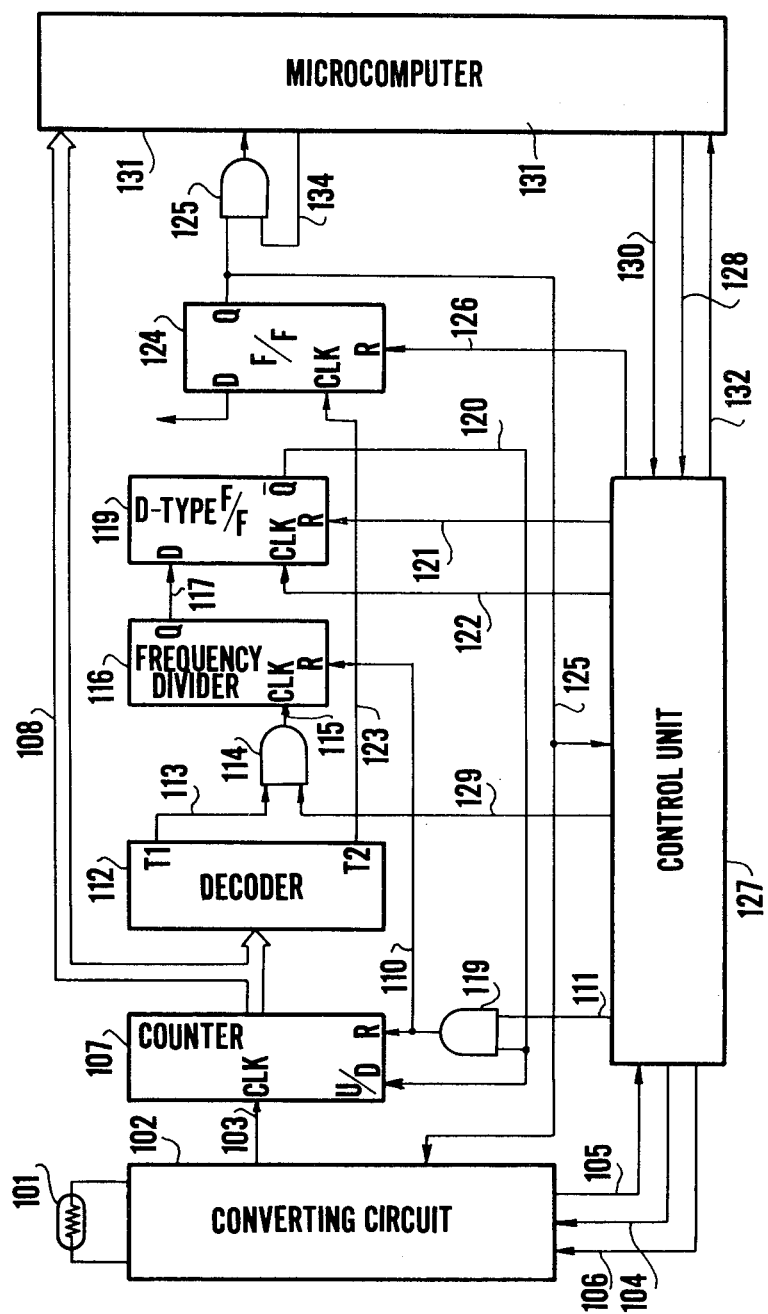
FIG. 5 is a block diagram illustrating the embodiment of FIG. 4 in greater detail.

The construction and operation of the present embodiment will now be descibed in greater detail with reference to FIGS. 5 and 6.

As shown in FIG. 1, a thermister 101 for measuring body temperature is connected to a circuit 102 (hereinafter referred to as a converting circuit) for converting resistance into a pulse frequency. The converting circuit 102 receives a reference clock signal 106 and a conversion command signal 104 from a control unit 127. When the command signal 104 from the control unit 127 goes to logical "1", thereby constituting a start signal, the converting circuit 102 begins the conversion operation. Signal 104 is sent to logical "0" by a conversion end signal 105 which the converting circuit 102 delivers to the control unit 127, ending the conversion operation.

The converting circuit 102 may include an oscillator (OSC) the oscillation frequency whereof varies with the reference of the thermister 101, and a control circuit for controlling the oscillation, and is adapted to deliver pulses which the oscillator produces during a fixed time interval (namely the conversion time of the converting circuit). These pulses constitute the output of the converting circuit 102, as will be described below.

Figure 7:
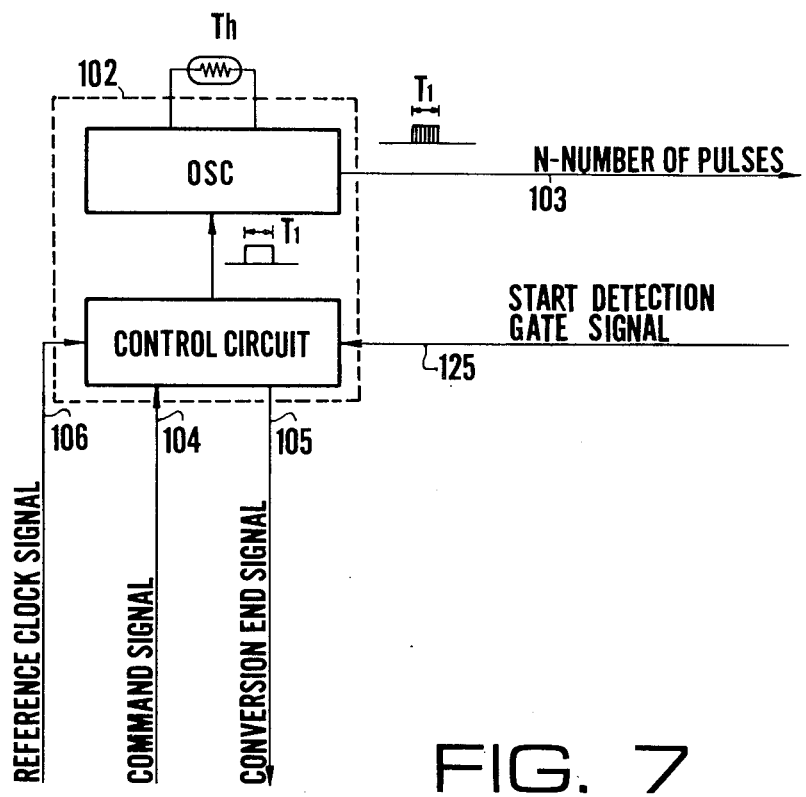
FIG. 7 is a block diagram illustrating an example of the specific construction of a device for converting resistance into a pulse frequency.

The construction and operation of converting circuit 102 may be understood from FIG. 7. The control circuit is equipped with a programmable timer which, in response to the start signal 104, supplies the oscillator OSC with a conversion command of a predetermined duration T1. Upon receiving the signal, the oscillator OSC produces a number of pulses corresponding to the length of time T1. The control circuit produces the conversion end signal 105 when the conversion time T1 expires. It should be noted that when the control circuit receives a measurement start signal 125, to be described below, the programmable timer is set to a value that establishes a conversion time longer than T1. These measures of time are produced on the basis of the reference clock signal 106.

Returning to FIG. 5, the abovementioned pulses produced by the converting circuit 102 exit as a data pulse output signal 103. These pulses constitute the clock (CLK) input to a counter 107. The counter 107 is of the reversible counting-type and has an up/down (U/D) terminal for deciding the counting direction. When logical "1" appears at terminal U/D, the counter 107 counts up its clock input. Logical "0" at terminal U/D causes the clock input to be counted down. R denotes the reset terminal of counter 107. The data output 108 of counter 107 is applied to a decoder 112 as a data input.

The decoder 112 is adapted to produce a logical "1" output on its output terminal T1 upon receiving from counter 107 a data input equivalent to 100 pulses, this occurring when the thermister 101 senses a temperature of 30° C. A signal appears on output terminal T2 of the decoder 112 when logical "0" is applied to the U/D terminal of counter 107 and the counter counts down to −3, applying this data to the decoder 112. Numeral 113 denotes the output signal obtained from terminal T1. This signal is applied to an AND gate 114 whose other input is a decode control signal 129 from the control unit 127. When the thermister 101 senses a temperature of 30° C. or more, causing an output to appear on terminal T1 of the decoder 112, and when the decode control signal 129 is logical "1", the output signal 117 of a divider-by-2 frequency divider 116 goes to logical "1". This signal is applied to the data input of a D-type flip-flop 119. The clock input to the flip-flop 119 is read pulse 122 produced by the control unit 127 in sync with the trailing edge of the conversion command signal 104 in order that the data input may be stored in the flip-flop 119. With the data input to flip-flop 119 being logical "1", its Q output, namely an up/down control signal 120, goes to logical "0". The counter 112, which receives the Q output at its U/D terminal, is switched over from the up-count to the down-count mode and begins counting down the pulses 103. In addition, a counter reset signal 111 is gated by an AND gate 109 and not allowed to pass. Accordingly, the data pulse input 103 to the counter 107 resulting from the next conversion command signal 104 will count down the counter from the value of the previous up-count operation.

The final value resulting from the down-count operation will be zero when the previously measured temperature and the temperature just measured are the same. When the latter is higher, however, counter 107 is counted down beyond zero to a negative value. When this value reaches a count of, say, −3 (corresponding to a temperature of +0.3° C.) or a more negative value, an output pulse 123 emerges from terminal T2 of decoder 112 and enters a flip-flop 124 which responds by producing a signal 125 indicating that a meaningfull measurement may begin. This signal is applied to the converting circuit 102, placing it in a body temperature measurement mode and elevating its precision. The signal 125 is also applied to the restart terminal of the microcomputer. An AND gate 133 takes the AND between this signal and an interruption-request signal 134 generated every second, whereby the microcomputer 131 is started every second from its interrupt-start address.

A measurement start signal 130 from the microcomputer 131 functions as a sampling command. When the signal enters the control unit 127, the latter produces the conversion command signal 104 whereby the value corresponding to the temperature measured by the thermister 101 appears as the output data 108 from counter 107. This value is then read in, operated upon, processed and displayed by the microcomputer 131. At the end of the body temperature measurement, the microcomputer 131 sends a measurement end signal 128 to the control unit 127 to again establish a pre-measurement mode for sensing the start of a measurement. The microcomputer 131 again enters a stand-by state at this time to reduce power consumption.

Returning to the state of counter 107, a count of less than −3 (i.e., −2, −1, 0, +1 . . . ) will not cause the decoder 112 to produce the pulse 123. Flip-flop 124 therefore will not change state, and signal 125 will not appear. Since the divide-by-two frequency divider 116 is receiving the decoded output 115 at the start of the down-count operation, the output of the frequency divider again changes state at this time and, in consequence, so does flip-flop 119. The resulting high level of signal 120 places the counter 107 in the up-count mode and, with the arrival of signal 111, in the reset state. This re-establishes the conditions for detection of a temperature of 30° C. or more.

Figure 8:
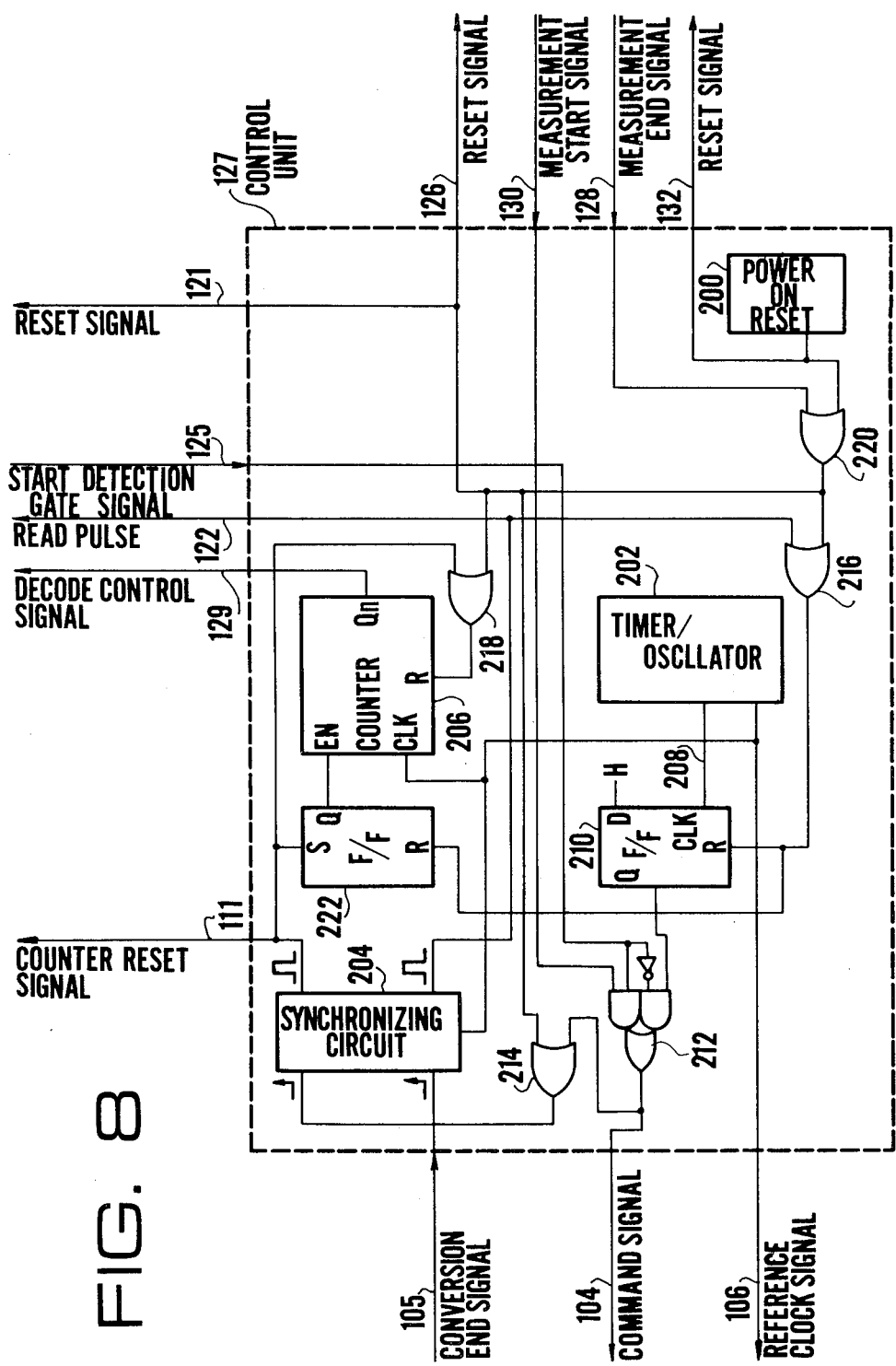
FIG. 8 is a block diagram illustrating the details of a control unit shown in FIG. 5.

The construction of the control unit 127 is shown in FIG. 8. Numeral 200 denotes a power-on reset circuit for producing the reset signal 132 when power is introduced to the electronic clinical thermometer 10 of this embodiment from the power supply 12. Signal 132, as well as being sent to the microcomputer, functions to reset the logic within the control unit 127. A timer/oscillator circuit 202 delivers the reference clock 106 to the converting circuit 102, the clock 106 also being used as a control clock for the logic within the control unit 127. By way of example, the clock 106 is used by a synchronizing circuit 204, comprising a plurality of flip-flops, to produce the pulses 111 synchronized to the clock 106 at the leading edge of its input signal, and is used as a timer counting clock by a counter circuit 206 for producing the decoder control signal 129. The oscillator circuit 202 also produces a clock 208. This serves as a pre-measurement timing clock, set to a period of four seconds, for use in the abovementioned pre-measurement operation of low accuracy. The periods of clocks 106, 208 can be set freely by the microcomputer 131. A pre-measurement flip-flop 210 is triggered by the leading edge of the clock 208 and produces the measurement start signal 104 prior to arrival of the start detection gate signal 125 via a gate 212. The other input to OR gate 212 is the measurement start signal 130 which sends the signal 104, being produced after the signal 125 is produced, to logical "1". An OR gate 214 is provided in order that the reset signal 111 for the counters 107, 206 may be formed in sync with the command signal 104 or the reset signal 126 from microcomputer 131. The conversion end signal 105 activates the synchronizing circuit 204 which responds by producing the read pulse 122 and, through an OR gate 216, by resetting corresponding flip-flops 210, 222. Reset signals 121 and 126 are produced by an OR gate 220 in response to the power-on reset signal 132 or the measurement end signal 128 from the microcomputer 131.

The circuit shown in FIG. 5 is constructed using C-MOS technology. At the instant power is introduced to the circuitry, the counter-set signal 111 and flip-flop-reset signals 121, 126 are produced to reset the counter and flip-flops. The microcomputer 131, on the other hand, receives a reset signal 132 for initialization, upon which the microcomputer is placed in the stand-by state to suppress power consumption.

Figure 9A:
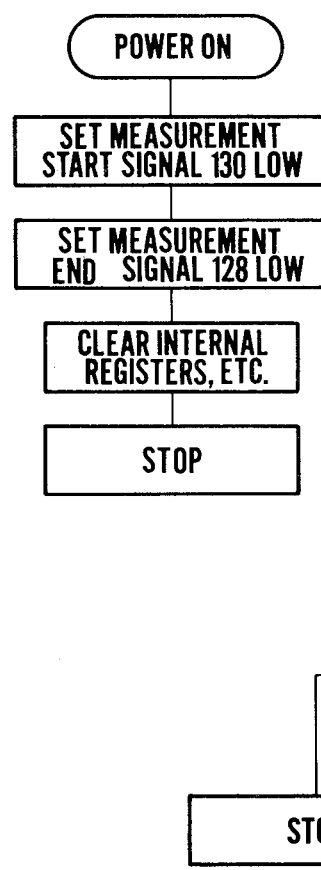

Reference will now be had to FIGS. 9A and 9 to describe the control of the microcomputer 131 when power is introduced.

Referring first to FIG. 9A, the measurement start signal 130 is set to a low level when power is introduced. Next, the measurement end signal 128 is set to the low level and the registers are cleared, establishing a halted state awaiting an interrupt.

Figure 9B:
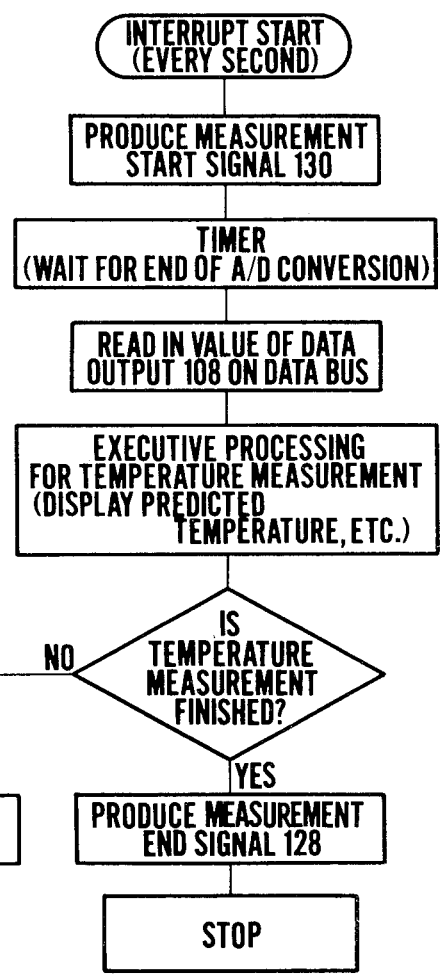

In FIG. 9B, the microcomputer 131 has been started by the interrupt start signal 134 generated every second and produces the measurement start signal 130. Thenceforth the timer is set and the microcomputer awaits for the end of an A/D conversion, i.e., for the conversion of temperature information into digital data. When the time kept by the timer expires, the data output 108 on the data bus is read in, computations and processing are executed on the basis of the data, the predicted temperature is displayed, and so forth. When the body temperature measurement ends, the measurement end signal 128 is produced and the CPU is halted. The CPU enters the halted state both after the execution of prescribed computations and in cases where the temperature measurement has not ended.

For a fuller understanding of the actions of the invention, the operation of the embodiment shown in FIG. 5 will be described in greater detail with reference to the timing chart of FIG. 6.

The conversion command signal 104, namely a pulse having a duration (e.g. 50 milliseconds) equivalent to the conversion time, is delivered to the converting circuit 102 by the control circuit 127 every four seconds. The converting circuit 102 produces the data pulse output signal 103 upon receiving the conversion command. The read pulse 122 is produced at the end of each 50-millisecond pulse in the conversion command signal 104. Assume not that counter 107 has begun counting the pulses 103 as they are produced by the converting circuit in response to the command signal 104. If the count does not exceed 100 (signifying that the temperature has not reached the threshold of 30° C.), then the decoded output 113 does not appear. As a result, the circuitry from the frequency divider 116 onward is inactive. When the second pulse in the command signal 104 arrives, the counter 107 again begins counting and, in this case, counts up to a number greater than 100, at which point logical "1" appears on output terminal T1 of decoder 112, sending the output signal 117 of frequency divider 116 to logical "1" as well. The read pulse 122 is produced in response to the conversion end signal 105 from the converting circuit 102, and causes the data-type flip-flop 119 to store the frequency divider output 117, the Q output of the flip-flop, namely signal 120, going to logical "0". Counter 107 therefore is switched over from the up-count to the down-count mode and is counted down by the next series of data pulses 103 produced by the converting circuit 102 in response to the next conversion command signal 104. In the course of being counted down, the value of the count passes the 100 mark, at which point logical "1" again appears at the output terminal T1 of the decoder 112. This "1" logic is stored in the flip-flop 119 by the read pulse 122 and sends the up/down control signal 120 to logical "1". When the counter reset signal 111 (logical "1") appears, AND gate 119 delivers a pulse since signal 120 is now high, thereby applying a reset pulse to the reset terminals R of counter 107 and the divide-by-two frequency divider 116. Counter 107, however, has not registered any temperature change. Thus, when the difference between the previous and latest temperature measurements is zero, the reset signal does not change the state of counter 107 since its content will already be zero because the up-count and down-count operations will have cancelled each other. It should be noted, however, that counter 107 will be cleared to zero if it has counted to a negative number of less than −3 (namely −2 or −1). Frequency divider 116 is in the reset mode.

Counter 7 now begins counting up the pulses 103 produced in response to the next conversion command signal 104. It will be assumed that the count surpasses 100. The "1" logic on output terminal T1 of decoder 112 is stored in flip-flop 119 by the read pulse 122, whereby the up/down control signal 120 is set to logical "0". When the next conversion command signal 104 arrives, counter 107 is counted down by the data pulses 103 and, when the 100 mark is passed, terminal T1 of the decoder goes to logical "1". The "1" logic sends the frequency divider output 117 to logical "1". In this case, however, we shall assume that a significant temperature change has been measured by the thermister so that the counter 107, which is executing the down-count operation, counts down to −3 before the next read pulse 122 is produced. Now, owing to the set conditions, decoder 112 produces a logical "1" signal, namely signal 123, at its output terminal T2. This signal is applied to the clock input terminal CLK of data-type flip-flop 124 and causes the flip-flop 124 to store its data input, sending its Q output to logical "1". This output signal, namely the start detection gate signal 125, is applied to the restart terminal of the microcomputer 131 and constitutes a restart signal, thereby starting the microcomputer from a predetermined address.

The present invention, having the construction and operating as described hereinabove, has a number of actions and effects which will now be set forth.

First, a specific temperature is set up as a threshold, and the start of an actual body temperature measurement is controlled based upon the detection of a certain temperature rise, namely a temperature gradient, above the threshold within a predetermined period of time. Accordingly, the electronic clinical thermometer of the invention does not rely upon detection of an impedance change to control the start of measurement, unlike the conventional electronic clinical thermometers, and therefore is less susceptible to external disturbances when carrying out such detection.

Furthermore, in accordance with the present invention, temperature data at the time of an actual measurement can be obtained from a temperature sensing unit combined with a unit that delivers temperature data indicative of the start of measurement. This enables a reduction in the number of component parts, contributes to a smaller thermometer, and is effective in enhancing the precision of both units. Also, since power consumption for the pre-measurement can be minimized up to the instant the beginning of measurement is sensed, the time the power supply is connected to the load is essentially limited to the time of an actual body temperature measurement. This allows a single power supply to be exploited to the maximum advantage.

Furthermore, according to the present invention, it is not necessary to provide a hole or notch for operating the power supply switch on the outer suface of the enclosure, thus the present electronic clinical thermometer can be designed as a compact thermometer formed integrally as shown in FIG. 2. Since this construction facilitates cleaning the outer surface of the enclosure and waterproofing so as to prevent a liquid like an antiseptic solution from entering inside the enclosure, it is possible to provide a compact electronic thermometer good both in durability and in sanitary condition.

As many apparently widely different embodiments of the present invention can be made without departing from the spirit and scope thereof, it is to be understood that the invention is not limited to the specific embodiments thereof except as defined in the appended claims.

What is claimed is:

1. An electronic clinical thermometer which comprises:

temperature sensing means for producing an output signal commensurate with temperature;

decision means for discriminating, on the basis of the output signal of said temperature sensing means, a temperature above a predetermined threshold temperature as well as a rising temperature gradient over a predetermined period of time, said decision means first discriminating a temperature above the threshold temperature and then discriminating a rising temperature gradient from said discriminated temperature; and measuring means placed in a measurement start mode by a discrimination signal from said decision means for initiating a temperature measurement on the basis of an input from said temperature sensing means;

said decision means comprising an up/down counter for producing an ouput signal commensurate with a temperature sensed by said temperature sensing means; and a decoder for producing a first output signal in response to an input signal from said up/down counter indicative of a count corresponding to a temperature above the threshold temperature, said first output signal changing over the counting direction of said up/down counter so that said counter is counted down by a value commensurate with temperature within said predetermined period of time, and said decoder producing a second output signal in response to an input signal from said up/down counter indicative of a count corresponding to a rising temperature gradient of a magnitude larger than that of a predetermined rising temperature gradient, said second output signal establishing the measurement start mode.

2. An electronic clinical thermometer according to claim 1, in which said decision means further includes reset means for resetting the value of the count in said up-down counter when said first output signal is not produced, and when said second output signal is not produced after the production of said first output signal.

3. An electronic clinical thermometer which comprises:

temperature sensing means for producing an output signal, commensurate with temperature, in the form of a digital value conforming to one of at least two resolutions, one of which is high and the other low, said temperature sensing means comprising temperature-to-frequency converting means, and a counter for counting the frequency and for producing a signal indicative thereof;

decision means for discriminating, on the basis of the output signal of said temperature sensing means conforming to the low resolution, a temperature above a predetermined threshold temperature as well as a rising temperature gradient over a predetermined period of time;

resolution setting means for changing over the resolution of said temperature sensing means from low to high resolution in response to a discrimination signal from said decision mean resolution setting means being responsive to an output from said decision means for changing over the duration of a sampling operation performed by said counter from a short to a long duration; and measuring means placed in a measurement start mode by a discrimination signal from said decision means for initiating a temperature measurement on the basis of the digital value, conforming to the high resolution, from said temperature sensing means;

said decision means comprising an up/down counter for producing an output signal commensurate with a temperature sensed by said temperature sensing means; and a decoder for producing a first output signal in response to an input signal from said up/down counter indicative of a count corresponding to a temperature above the threshold temperature, said first output signal changing over the counting direction of said up/down counter so that said counter is counted down within said predetermined period of time by a value commensurate with temperature, and said decoder producing a second output signal in response to an input signal from said up/down counter indicative of a count corresponding to a rising temperature gradient of a magnitude larger than that of a predetermined rising temperature gradient, said second output signal establishing the measurement start mode and controlling said resolution setting means.

4. An electronic clinical thermometer according to claim 3, in which said decision means further includes reset means for resetting the value of the count in said up-down counter when said first output signal is not produced, and when said second output signal is not produced after the production of said first output signal.

* * * * *